July 13, 1965
L. H. BUTTERFIELD
3,194,077
MOUNTING DEVICE FOR PRESSURE GAUGE
Filed Aug. 30, 1962
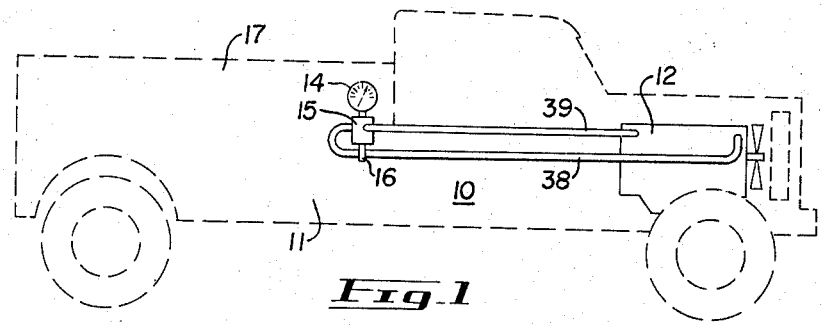
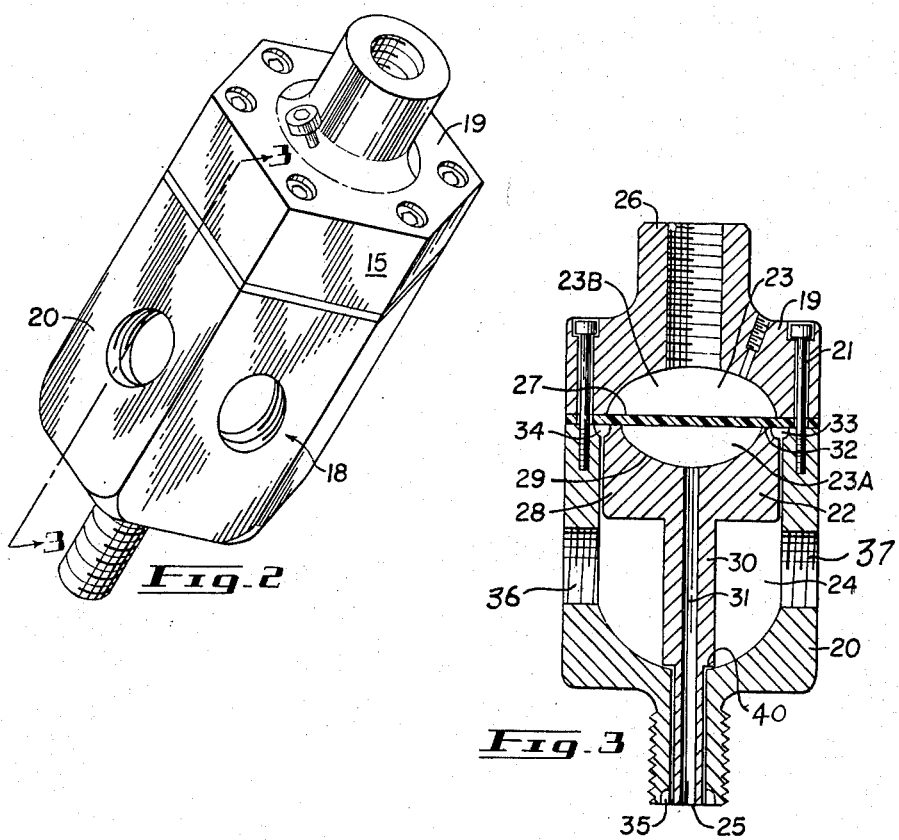
Inventor
Lloyd H. Butterfield
By Cushman, Darby & Cushman
Attorneys

United States Patent Office 3,194,077
Patented July 13, 1965

3,194,077
MOUNTING DEVICE FOR PRESSURE GAUGE
Lloyd H. Butterfield, Saskatoon, Saskatchewan, Canada, assignor of one-half to John Harold Stewart, Calgary, Alberta, Canada
Filed Aug. 30, 1962, Ser. No. 220,514
5 Claims. (Cl. 73—420)

This invention relates to mounting devices for fluid pressure indicating gauges and particularly to a mounting means adapted to prevent freezing of the fluid adjacent the gauge in adverse weather conditions.

Mounting devices are well known wherein such device is interposed between a conduit containing fluid under pressure and a gauge for indicating the pressure of such fluid. Gauges for this purpose are well known and may be of the type wherein the fluid is in contact with the gauge actuating mechanism or it may be separated therefrom by utilizing an intervening gas and/or fluid.

In fire fighting equipment, the fluid under pressure is usually water and obviously such fluid is subject to freezing under certain weather conditions. A frozen line leading to a pressure gauge renders the latter ineffective and in many instances could result in serious consequences.

Freezing preventing devices have been proposed for use on externally placed fire hydrants which are subject to the elements of the weather. These devices usually consist of an annular chamber surrounding the valve portion of the hydrant and included therein is a heating medium such as an electrical resistance element or the equivalent.

It is an object of the present invention to prevent the freezing of a gauge or fluid adjacent thereto whose pressure is to be measured and wherein such fluid and/or gauge are subjected to adverse weather normally associated with the freezing of the fluid into a solid.

Accordingly, the present invention consists of a gauge mounting and freezing preventing device adapted to be interposed between a gauge and a fluid pressure system comprising a housing having a first and second pair of fluid confining non-communicating chambers, an inlet and outlet in communication with each of said chambers, said inlet and outlet of said first chamber being connected respectively to said pressure system and said gauge, the latter thereby to indicate the pressure of the fluid in said system, and means for circulating a fluid heating medium through said second chamber thereby to prevent freezing of fluid in said gauge.

The invention is illustrated by way of example in the accompanying drawing wherein:

FIG. 1 is a partial block diagram illustrating a fluid pressure gauge secured by a mounting device constructed in accordance with the present invention upon a truck;

FIG. 2 is a perspective view of the mounting device; and

FIG. 3 is a cross-sectional view along section 3—3 of FIG. 2.

Referring now in detail to the drawing, shown in FIG. 1 is a truck 10 having a frame portion 11 and a motor 12. The motor is cooled by a suitable fluid circulating through the cooling system.

A pressure gauge 14 is mounted exteriorly on the truck's frame portion 11 and is connected by mounting device 15 and conduit 16 to a fluid pressure system mounted upon the load carrying portion 17 of the truck. The pressure system may be that of fire fighting equipment carried by a truck or it may be other fluid handling equipment normally handling fluids subject to freezing under certain climatic conditions.

The mounting device 15 consists of a housing 18 having an upper part 19 and a lower part 20, detachably secured together by studs 21. The housing includes a central cavity separated by a member 22 into a first chamber 23 and a second chamber 24. Also included in the housing is a first inlet 25 consisting of an externally threaded spigot adapted to be connected to the pressure system by conduit 16 and an internally threaded first outlet spigot 26, each formed integrally respectively with the housing parts 20 and 19. The first inlet 25 and first outlet 26 are connected to the first chamber 23 respectively to chamber portions 23A and 23B, which are separated by a flexible diaphragm 27 clamped between the housing parts 19 and 20.

The member 22 consists of a flange portion 28 having a spherical cavity 29 on the surface adjacent the diaphragm 27, and a stem 30 projecting from the opposite face and terminating within the inlet spigot 25. The member 22 includes an annular upper seat 32 which bears against the diaphragm, the diaphragm, together with the spherical cavity, define the chamber portion 23A. Member 22 includes a central passage 31 through the stem and terminates in the cavity surface thereby placing the chamber portion 23A into fluid communication with the first inlet 25.

Adjacent the seat 32 is an external chamfered portion 33 which, together with internal chamfer portion 34 of housing part 20, forms an annular groove which may be filled with a thermosetting plastic thereby to sealing separate chamber portion 23A from chamber 24. Similarly, thermosetting plastic may be placed in an annular groove 35 formed internally of the inlet spigot 25 thereby to sealing separate passage 31 from chamber 24.

The housing includes a second inlet 36 and a second outlet 37 which are in communication with the chamber 24 and are adapted to be connected respectively to conduits 38 and 39, which in turn are in communication with the fluid cooling system of the vehicle's engine 12.

Fluid pressure from the pressure system enters chamber portion 23A by passage 31 and diaphragm 27 transfers the pressure to the gauge through chamber 23 which may be fluid and/or gas filled. In some types of gauges, the diaphragm may be dispensed with, if desired, thus allowing direct contact between the fluid pressure and gauge actuating mechanism.

A portion of the vehicle's cooling fluid from the motor is directed via conduit 39 to the chamber 24 and returned via conduit 38. The heated fluid from the vehicle's motor thereby is circulated through the chamber 24 of the mounting thus heating the same to prevent freezing of the fluid in passage 31, conduit 16 and fluid in chamber portions 23A and B.

The above described mounting device is preferably used for mounting water pressure gauges upon trucks fitted with fire fighting equipment. It will, however, be apparent these mountings need not be limited to such application. Furthermore, the gauges may be mounted interiorly of the cab portion of the truck rather than exteriorly as illustrated in the drawing.

It will also be noted that the stem 30 of member 22 includes shoulder 40 which abuts against the interior wall of chamber 24 thereby appropriately positioning seat 32 with respect to the diaphragm 27. Other retaining means obviously may be used, i.e., an annular rib projecting inwardly of the chamber 24 adjacent the lower face of the flange portion 28 of member 22.

I claim:

1. A gauge mounting device for use in preventing freezing of fluid in said gauge comprising a housing having a central cavity and including a pair of detachably secured together portions, a member disposed within one of said portions separating said cavity into first and second fluid confining non-communicating chambers, each of said chambers having an inlet and an outlet, a flexible diaphragm interposed between said housing portions separating said first chamber into separate fluid confining portions, said inlet and outlet of said first chamber being in communication respectively with a separate one of said chamber portions and adapted to be connected respectively to a fluid pressure system and a gauge, the latter indicating the pressure in said system and said inlet and outlet of said second chamber being adapted to be connected to a circulating fluid heating medium thereby to heat said second chamber and thus prevent freezing of fluid therein.

2. In a mobilized fluid pressure handling system including gauges to indicate pressure in said system and a fluid cooled engine associated with said system, a device for mounting said gauges and preventing freezing of fluid in the latter comprising a housing having a central cavity and including a pair of portions detachably secured together, a member removably disposed within one of said portions separating said cavity into first and second fluid confining non-communicating chambers, a flexible diaphragm disposed between said housing portions separating said first chamber into a pair of non-communicating portions each of said chambers having an inlet and an outlet, said first chamber having one portion thereof in fluid communication with said gauge and the other portion in communication with said pressure system thereby to indicate pressure in said system and said second chamber being in communication with the fluid coolant of said engine thereby to prevent freezing of fluid in said first chamber and gauge.

3. A device as defined in claim 2 wherein said removable member separating said cavity into said first and second fluid confining non-communicating chambers consists of a flange portion in circumferential fluid sealing contact with said diaphragm a stem projecting from one face of said flange through said second chamber and terminating in said housing, said stem including an axial bore and providing said inlet to said first chamber.

4. A pressure gauge mounting device comprising a housing having a central cavity and including a pair of portions detachably secured together, one of said portions being relatively larger than the other, a member removably disposed within the larger one of said portions and having a flange located adjacent the junction of said portions separating said cavity into first and second fluid confining non-communicating chambers, a flexible diaphragm disposed between said pair of housing portions dividing said first chamber into a pair of non-communicating portions, said first chamber being relatively smaller than said second chamber, inlet and outlet means in each of said chambers, the inlet of said first chamber being in communication with one portion thereof and the other being in communication with the other portion, said inlet and outlet of the first chamber being adapted for connection respectively to a fluid pressure system and a gauge to indicate the pressure in the latter, and said second chamber being adapted to be connected to a circulating fluid heating medium thereby to prevent freezing of fluid in said first chamber and said gauge.

5. A mounting device as defined in claim 4 wherein said inlet to said first chamber consists of a conduit extending through said second chamber.

References Cited by the Examiner
UNITED STATES PATENTS

| | | | |
|---|---|---|---|
| 138,562 | 5/73 | Hayes | 137—340 X |
| 1,461,520 | 7/23 | Forman | 137—340 |
| 1,691,758 | 11/28 | Fausek et al. | 137—340 |
| 2,216,374 | 10/40 | Martin | 73—420 X |
| 2,706,408 | 4/55 | Holbrook | 73—212 |

RICHARD C. QUEISSER, *Primary Examiner.*